Sept. 23, 1924.　　　　　　　　　　　　　　1,509,477
M. KASSER
EGG CARRIER
Filed Feb. 7, 1923

INVENTOR.
MORRIS KASSER.
BY White Prost Evans
his ATTORNEYS.

Patented Sept. 23, 1924.

1,509,477

UNITED STATES PATENT OFFICE.

MORRIS KASSER, OF SAN FRANCISCO, CALIFORNIA.

EGG CARRIER.

Application filed February 7, 1923. Serial No. 617,435.

*To all whom it may concern:*

Be it known that I, MORRIS KASSER, a citizen of the United States, and a resident of the city and county of San Francisco, in the State of California, have invented a new and useful Egg Carrier, of which the following is a specification.

This invention relates to a device for transporting eggs, and more particularly to a carrier for eggs that may be quickly unloaded by a comparatively simple operation.

It is often necessary, either before or after eggs have reached a distribution point, to apply certain tests for determining whether they are of the desired quality. Again, eggs are sometimes removed from the crates and replaced after they have been subjected to a preserving process. For other purposes also, it has been found necessary to convey eggs from place to place in comparatively small quantities and to deposit them finally into an egg crate. It is one of the objects of my invention to provide a simple egg carrier that may be utilized for the transportation of eggs for any or all of the purposes enumerated.

It is still an other object of my invention to provide such a carrier which may be operated to release the eggs in a very simple manner, as by a slight rotation of a member associated with the carrier.

It is still an other object of my invention to provide an egg carrier having cells for the accommodation of the eggs that are formed from material sufficiently resilient to permit the accommodation of various sizes of eggs without danger of injuring them.

My invention possesses other advantageous features, some of which, with the foregoing, will be set forth at length in the following description where I shall outline in full those forms of my invention which I have selected for illustration in the drawings accompanying and forming part of the present specification. Although I have shown but a few embodiments of my invention in the drawings, it is to be understood that I do not desire to be limited thereto, since the invention as expressed in the claims may be embodied in other forms also.

Referring to the drawings.

Figures 3, 4:
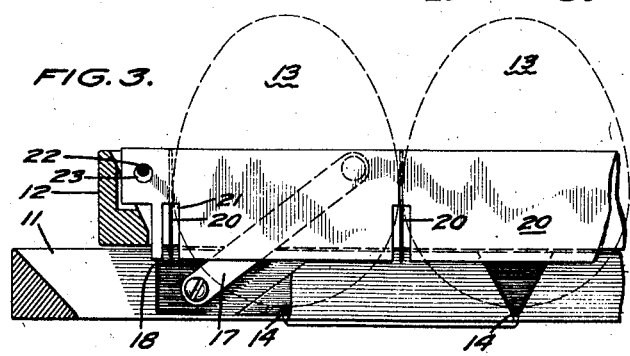
Fig. 3 is a detail section view taken along plane 3—3 of Fig. 1.
Fig. 4 is a detail view of a modification.

The egg carrier has a bottom frame 11 and a top frame 12. The eggs 13 are adapted to rest, preferably in an upright position, upon supports in the lower frame 11 and to be supported at their sides by the upper frame 12. The bottom frame 11 is formed in such a way that it has apertures large enough to permit the eggs 13 to drop through, but while carrying eggs, these apertures are out of alinement with the eggs, and they are thus prevented from passing through these passageways. In the present instance, a series of parallel wires 14 is used to form the apertures. These wires may be strung back and forth on pins or screws 15 located on two opposite sides of the frame 11, or else, as shown in Fig. 4, they may be disposed in horizontal slots 16 whereby they may have a limited lateral movement. The frame 11 is preferably made from a four-sided, open casting, that facilitates the arrangement of these wires 14 to form a series of rectangular apertures. The wires 14 are flexible, so that they give under the impact of the falling egg, thus providing a cushion which reduces the liability of egg breakage to a minimum.

Figure 2:
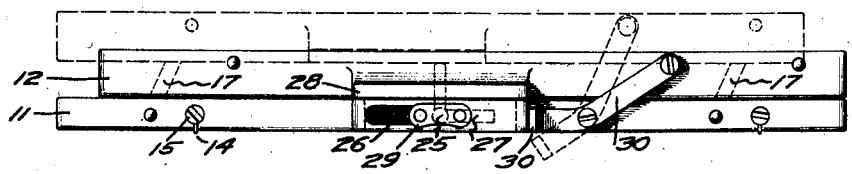
Fig. 2 is a side elevation of the carrier shown in Fig. 1.

In order to aline these apertures with the eggs 13 so that they may drop through frame 11, the upper and lower frames are movable laterally with respect to each other. For this purpose a plurality of links 17 are provided, which pivotally connect to both frames 11 and 12. As shown in greater detail in Fig. 3, the frame 12 may be moved over toward the left of frame 11 and guided by the links 17, which rotate in a counterclockwise direction and cause a slight lifting of frame 12 as well as a lateral movement. The frame 12 in this position is indicated in dotted lines in Fig. 2. The movement is limited by appropriate stops, such as shoulders 18 on frame 11, adapted to engage with the edge of links 17. To move the upper frame 12 into this position, it is merely necessary to provide a turning torque to the links 17, and this may be accomplished by applying a horizontal force against the right hand edge of frame 12. The arrangement is furthermore such that upon release of the frame 12, it drops back into the full line position on top of frame 11.

The upper frame 12 is divided into a series of square cellular compartments 19, by the aid of resilient metal strips 20, arranged at right angles to each other. These strips dovetail together, in a manner entirely similar to that of the pasteboard strips used in egg crates for supporting eggs therein. The strips 20 have slots or notches 21 which extend substantially half way through the width of the strips, and which make it possible for the strips to dovetail properly together. The slots or notches 21 are made rather wide, say about an eighth or a quarter of an inch, in order that the strips 20 may have some freedom of movement relative to each other and thus to provide compartments 19 of variable size. This is useful where eggs of varying sizes are to be accommodated and it is for this reason also that strips 20 are made flexible.

The strips 20 are held in frame 12 by the aid of wires or rods 22 upon which these strips are strung. These wires 22 are appropriately fastened into the sides of frame 12, and pass through apertures 23 in the strips. These apertures are purposely made large enough so as to permit the resilient strips 20 a large amount of play.

Figure 1:
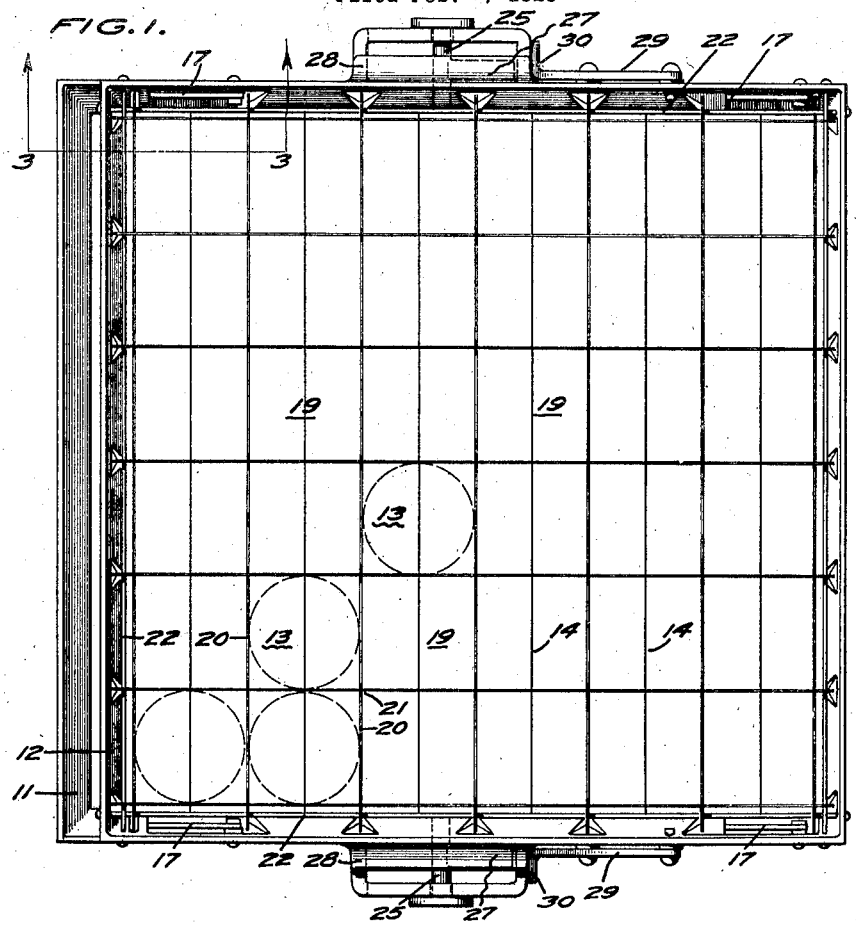
Figure 1 is a top plan view of an egg carrier embodying my invention.

The carrying position of frame 12 is that shown in Fig. 1, where wires 14 of the lower frame 11 extend substantially through the centers of the egg compartments 19. The eggs 13 rest on these wires and are supported in an upright position by the aid of the strips 20. To unload the eggs 13, frame 12 is moved to the left so that wires 14 fall directly under the vertical strips 20, and there is no longer any hindrance to the passage of the eggs through the lower frame.

Although, as pointed out heretofore, a force exerted against the side of frame 12 may be used to cause alinement of the apertures, there may be provided a rotatable operating member for effecting this result. For this purpose a pair of projections are provided on the lower frame, within which keys 25 may be rotated. Slots 26 in these projections permit the insertion of the keys, which have an operating portion 27 adapted to coact with the bottom surface of a ledge or boss 28 projecting from the upper frame 12. It is evident that by turning the keys 25 in a counterclockwise direction, they serve to lift up and move over to the left the entire upper frame 12. In the present instance the keys 25 are shown as made integral with links 29 of a flexible sprocket chain, the movement of which link over appropriate guides serving to operate the key, but it is of course possible to operate the keys 25 in many other ways.

Although there is little possibility of one or more eggs getting stuck within the frame 11, I provide a device for positively closing the frame. This may operate without injury to the eggs, due to the resilient nature of the strips 20 as well as to their freedom of play. To effect this closure, a pair of links 29 pivotally connecting the two frames are provided, which links have projections 30. These projections may be positively engaged, either manually or by some mechanism, to rotate the links in a clockwise direction to close the frame.

The operation of the device is believed to be evident from the foregoing description. The arrangement of the compartments 19 is purposely made the same as that in standard egg crates, and the carrier may be positioned directly over such an egg crate and unloaded therein. The reverse operation of loading the carrier from an egg crate consists in lifting out a whole layer of eggs from the crate, with its pasteboard structure upon a flat plate or shovel depositing the plate on top of frame 12 so as to aline the eggs thereon with the compartments 19, and withdrawing the plate, which latter act permits the eggs to fall into the carrier.

I claim:

1. An egg carrier comprising a pair of relatively movable frames having apertures extending through the frames, and means for moving the frames to aline the apertures.

2. An egg carrier comprising a pair of frames having apertures, link connections between the frames, and means for swinging the frames relatively to each other to aline the apertures.

3. An egg carrier comprising a frame, and a plurality of vertically disposed thin flexible metallic strips extending across said frame at right angles to each other and loosely joined to the frame to provide a plurality of egg receiving compartments of variable size.

4. An egg carrier comprising a frame and a plurality of angularly movable vertically disposed thin flexible metallic strips extending across said frame at right angles to each other to provide a plurality of egg receiving compartments of variable size.

5. An egg carrier comprising a frame, a series of thin metallic flexible strips extending across the frame in one direction, a second series of thin metallic flexible strips extending across the frame at right angles to said first series, both of said series of strips being notched and said two series being halved together, the notches being of greater width than the metal to permit lateral movement of the strips.

6. An egg carrier comprising a pair of superposed frames having apertures, and a rotatable member for alining the apertures in the two frames.

7. An egg carrier comprising a pair of superposed frames having apertures, and a key rotatable in one of the frames for moving the other frame so as to aline the apertures.

8. In an egg carrier, a pair of superposed frames, and means for discharging eggs from the carrier, comprising means whereby one frame may be made to move relatively to the other.

9. In an egg carrier, a pair of superposed relatively movable connected frames, parallel wires extending across the open bottom of the lower frame, and means forming cellular compartments in the upper frame.

10. In an egg carrier, a pair of superposed, relatively movable connected frames, parallel wires extending across the open bottom of the lower frame, and flexible metallic strips forming cellular compartments in the upper frame.

11. In an egg carrier, a pair of superposed, connected frames, said frames having apertures capable of alinement, means for moving the frames relatively so as to aline the apertures, and separate means for moving the frames so as to destroy the alinement.

12. In an egg carrier, a pair of superposed frames, links connecting the frames, said frames having apertures capable of alinement, and means for moving the frames relatively so as to aline the apertures, comprising a key rotatable in one of said frames, said key having an operating portion coacting with a surface on the other frame.

13. In an egg carrier, a pair of superposed frames, said frames having apertures capable of alinement, links connecting the frames whereby they may be moved relatively to each other while maintaining their parallelism, and means for limiting the movement of the frames, said links being so arranged that there is a gravital tendency for the frames to return to a position where apertures are out of alinement.

14. In an egg carrier, a pair of superposed, relatively movable connected frames, parallel flexible wires extending across the lower frame and means forming cellular compartments in the upper frame, said flexible wires normally lying below and in line with the compartments to support articles contained in the compartments.

In testimony whereof, I have hereunto set my hand.

MORRIS KASSER.